(12) United States Patent
Nishimura et al.

(10) Patent No.: US 10,908,413 B2
(45) Date of Patent: Feb. 2, 2021

(54) ROTARY DRIVE APPARATUS

(71) Applicant: Nidec Corporation, Kyoto (JP)

(72) Inventors: Hideki Nishimura, Kyoto (JP); Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 736 days.

(21) Appl. No.: 15/479,521

(22) Filed: Apr. 5, 2017

(65) Prior Publication Data

US 2017/0317555 A1    Nov. 2, 2017

Related U.S. Application Data

(60) Provisional application No. 62/328,844, filed on Apr. 28, 2016.

(51) Int. Cl.
| | |
|---|---|
| *G02B 26/10* | (2006.01) |
| *G02B 7/18* | (2006.01) |
| *H02K 1/27* | (2006.01) |
| *H02K 7/08* | (2006.01) |
| *H02K 7/14* | (2006.01) |
| *G02B 7/182* | (2006.01) |

(52) U.S. Cl.
CPC ......... *G02B 26/105* (2013.01); *G02B 7/1821* (2013.01); *H02K 1/2706* (2013.01); *H02K 1/2786* (2013.01); *H02K 7/08* (2013.01); *H02K 7/083* (2013.01); *H02K 7/14* (2013.01)

(58) Field of Classification Search
CPC .... H02K 16/02; H02K 1/2706; H02K 1/2786; H02K 7/08; H02K 7/083; G02B 26/105; G02B 7/1821
USPC .................... 310/74, 81; 235/462.22, 462.25
See application file for complete search history.

(56) References Cited

U.S. PATENT DOCUMENTS

| | | | | |
|---|---|---|---|---|
| 5,367,399 A | * | 11/1994 | Kramer | G02B 26/106 250/236 |
| 6,445,096 B1 | * | 9/2002 | Saito | H02K 1/2793 310/156.01 |
| 7,880,354 B2 | | 2/2011 | Higashihara et al. | |
| 2007/0025001 A1 | * | 2/2007 | Ueda | G02B 26/008 359/892 |

(Continued)

FOREIGN PATENT DOCUMENTS

| | | | | | |
|---|---|---|---|---|---|
| JP | 59067844 | A | * | 4/1984 | ............... H02K 7/02 |
| JP | 11183826 | A | * | 7/1999 | |
| JP | 2002071809 | A | * | 3/2002 | |

OTHER PUBLICATIONS

Seto (JP 11183826 A) English Translation (Year: 1999).*
Yamabuchi (JP 2002071809 A) English Translation (Year: 2002).*
Kawakami (JP 59067844 A) English Translation (Year: 1984).*

*Primary Examiner* — Tulsidas C Patel
*Assistant Examiner* — Robert E Mates
(74) *Attorney, Agent, or Firm* — Keating & Bennett

(57) ABSTRACT

This rotary drive apparatus includes a stationary portion including a stator; and a rotating portion supported through a bearing portion to be rotatable about a central axis extending in a vertical direction with respect to the stationary portion, the rotating portion including a magnet arranged opposite to the stator. The bearing portion includes an upper bearing portion, and a lower bearing portion arranged below the upper bearing portion. A center of gravity of the rotating portion is located below an upper end of the upper bearing portion and above a lower end of the lower bearing portion.

18 Claims, 6 Drawing Sheets

(56) References Cited

U.S. PATENT DOCUMENTS

| | | | | |
|---|---|---|---|---|
| 2008/0157619 A1* | 7/2008 | Wu | ........................ | H02K 29/03 |
| | | | | 310/156.48 |
| 2010/0033870 A1* | 2/2010 | Sekii | ..................... | F16C 17/107 |
| | | | | 360/99.08 |
| 2012/0275915 A1* | 11/2012 | Konishi | ................ | F04D 17/164 |
| | | | | 415/206 |
| 2015/0092256 A1* | 4/2015 | Ono | .................... | F16D 65/0006 |
| | | | | 359/200.7 |
| 2015/0229193 A1* | 8/2015 | Chen | ..................... | H02K 21/24 |
| | | | | 310/114 |

* cited by examiner

ROTARY DRIVE APPARATUS

CROSS REFERENCE TO RELATED APPLICATIONS

This application claims the benefit of priority to U.S. patent application No. 62/328,844 filed on Apr. 28, 2016. The entire contents of this application are hereby incorporated herein by reference.

BACKGROUND OF THE INVENTION

1. Field of the Invention

The present invention relates to a rotary drive apparatus.

2. Description of the Related Art

Known scanner apparatuses for position recognition used in combination with head-mounted displays (HMDs), for example, typically have motors to rotate the scanner apparatuses installed therein. Such a known motor is described in, for example, JP-A 2009-124935.

In the motor described in JP-A 2009-124935, a center of gravity of a rotor portion including a rotor hub, a rotor magnet, and a shaft is located axially above a tubular drawn portion of a base in which a sleeve is inserted. In addition, adhesive retaining portions for an adhesive used to fix the sleeve and the base to each other are defined in an axially upper portion of the tubular drawn portion to increase the strength with which the members are adhered to each other in the vicinity of the center of gravity of the rotor portion. This leads to improved shock resistance of the motor.

However, in the motor described in JP-A 2009-124935, the center of gravity of the rotor portion, which has a large specific gravity, is located on an axially upper side in the motor. This may cause unstable rotation of the motor.

SUMMARY OF THE INVENTION

A rotary drive apparatus according to a preferred embodiment of the present invention includes a stationary portion including a stator; and a rotating portion supported through a bearing portion to be rotatable about a central axis extending in a vertical direction with respect to the stationary portion, the rotating portion including a magnet arranged opposite to the stator. The rotating portion includes a shaft arranged to extend along the central axis; a first rotor hub portion arranged to extend in an annular shape around the shaft; a second rotor hub portion arranged below the first rotor hub portion, and arranged to extend in an annular shape around the shaft; a first inertia portion directly or indirectly fixed to the first rotor hub portion, and having a specific gravity greater than that of the first rotor hub portion; and a second inertia portion directly or indirectly fixed to the second rotor hub portion, and having a specific gravity greater than that of the second rotor hub portion. The stationary portion includes a sleeve portion arranged to rotatably support the shaft, and a base portion arranged to directly or indirectly support the sleeve portion. The first inertia portion is arranged above the base portion. The second inertia portion is arranged below the base portion. The bearing portion includes an upper bearing portion, and a lower bearing portion arranged below the upper bearing portion. A center of gravity of the rotating portion is located below an upper end of the upper bearing portion and above a lower end of the lower bearing portion.

According to the above preferred embodiment of the present invention, the inertia portions, each of which has a large specific gravity, are arranged above and below the base portion of the rotary drive apparatus, so that the center of gravity of the rotating portion can be located in the vicinity of a center of a motor. In addition, the center of gravity is located between the upper end of the upper bearing portion and the lower end of the lower bearing portion, the upper and lower bearing portions intervening between the stationary portion and the rotating portion, so that rotation of the motor is stabilized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor, which will be described below, is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a light source is arranged with respect to the motor is defined as an upper side. The shape of each member or portion and relative positions of different members or portions will be described based on the above assumptions. It should be noted, however, that the above definitions of the vertical direction and the upper side are not meant to restrict in any way the orientation of a rotary drive apparatus according to any preferred embodiment of the present invention when in use. Also note that the term "parallel" as used herein includes both "parallel" and "substantially parallel". Also note that the term "perpendicular" as used herein includes both "perpendicular" and "substantially perpendicular".

1. First Preferred Embodiment

Figure 1:
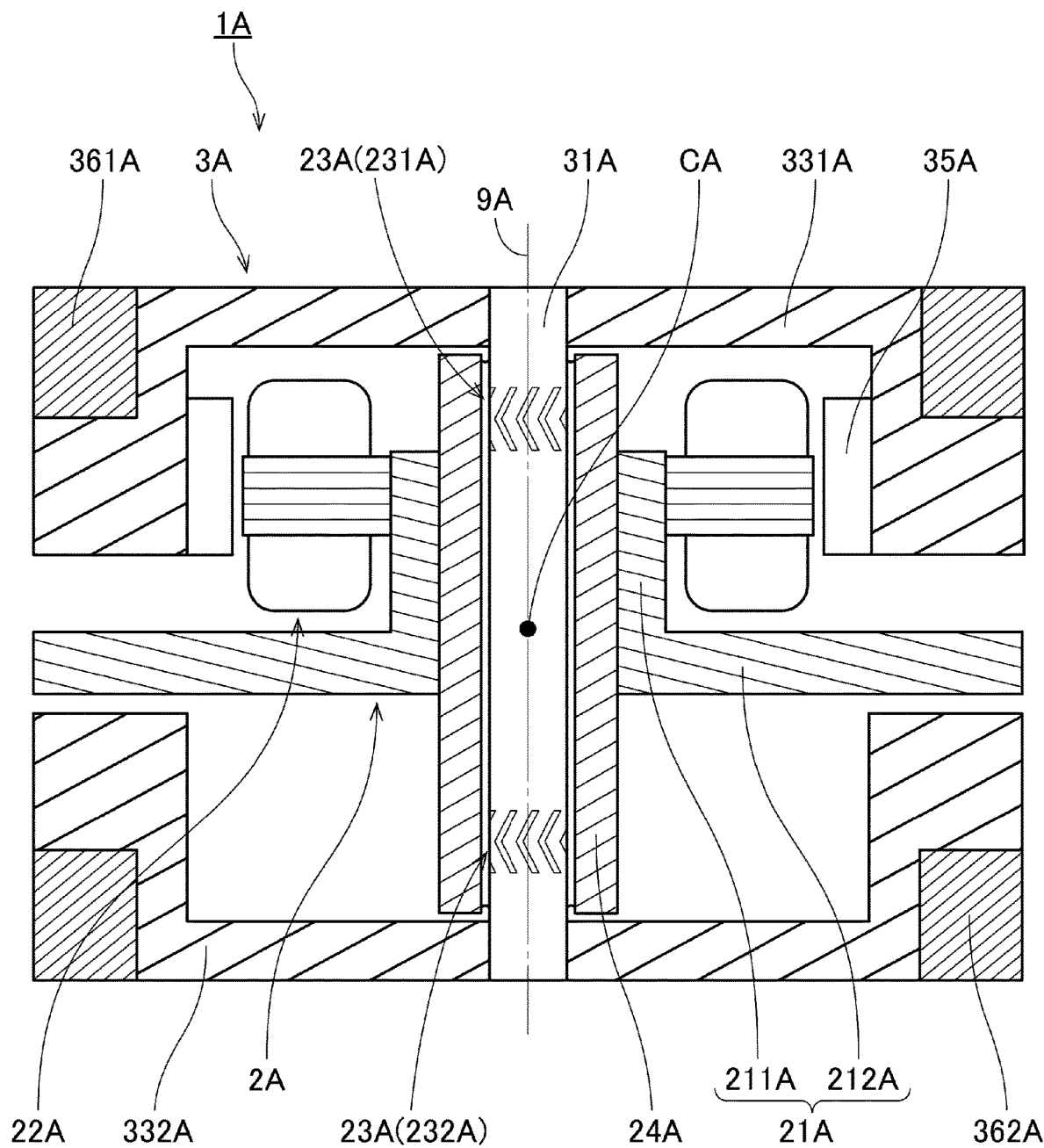
FIG. 1 is a vertical sectional view of a rotary drive apparatus according to a first preferred embodiment of the present invention.

FIG. 1 is a vertical sectional view of a rotary drive apparatus 1A according to a first preferred embodiment of the present invention. The rotary drive apparatus 1A is used to rotate a rotating body including a mirror that reflects incident light coming from a light source. As illustrated in FIG. 1, the rotary drive apparatus 1A includes a stationary portion 2A and a rotating portion 3A. The rotating portion 3A is supported through a bearing portion 23A, which will be described below, to be rotatable about a central axis 9A extending in the vertical direction with respect to the stationary portion 2A.

The stationary portion 2A includes a base portion 21A, a stator 22A, the bearing portion 23A, and a sleeve portion 24A.

The base portion 21A includes a stator holder 211A and a base body 212A. The stator holder 211A is arranged to hold the stator 22A on an outer circumferential surface thereof. The base body 212A is arranged to extend perpendicularly to the central axis 9A from a lower end portion of the stator holder 211A.

The bearing portion 23A includes an upper bearing portion 231A and a lower bearing portion 232A. The lower bearing portion 232A is arranged below the upper bearing portion 231A.

The sleeve portion 24A is a member arranged to extend in the axial direction to substantially assume a cylindrical shape, and rotatably support a shaft 31A, which will be described below, through the bearing portion 23A around the shaft 31A. The sleeve portion 24A is inserted radially inside of the stator holder 211A, and is supported by being fixed to the stator holder 211A through, for example, an adhesive. Note that the sleeve portion 24A may be directly supported by the stator holder 211A, or indirectly supported thereby with another member therebetween.

The rotating portion 3A includes the shaft 31A, a first rotor hub portion 331A, a second rotor hub portion 332A, a magnet 35A, a first inertia portion 361A, and a second inertia portion 362A.

The shaft 31A is a columnar member arranged to extend along the central axis 9A.

The first rotor hub portion 331A is arranged to extend in an annular shape around an upper end portion of the shaft 31A. The second rotor hub portion 332A is arranged below the first rotor hub portion 331A, and is arranged to extend in an annular shape around a lower end portion of the shaft 31A.

The magnet 35A is substantially cylindrical, and includes a pole surface arranged radially opposite to the stator 22A.

The first inertia portion 361A is an annular member having a specific gravity greater than that of the first rotor hub portion 331A. The first inertia portion 361A is arranged above the base portion 21A, and is fixed to the first rotor hub portion 331A through, for example, an adhesive. Note that the first inertia portion 361A may be directly fixed to the first rotor hub portion 331A, or indirectly fixed thereto with another member therebetween. The second inertia portion 362A is an annular member having a specific gravity greater than that of the second rotor hub portion 332A. The second inertia portion 362A is arranged below the base portion 21A, and is fixed to the second rotor hub portion 332A through, for example, an adhesive. Note that the second inertia portion 362A may be directly fixed to the second rotor hub portion 332A, or indirectly fixed thereto with another member therebetween.

A center CA of gravity of the rotating portion 3A is located below an upper end of the upper bearing portion 231A and above a lower end of the lower bearing portion 232A. The first and second inertia portions 361A and 362A, each of which has a large specific gravity, are arranged in upper and lower portions, respectively, of the rotating portion 3A as described above, so that the center CA of gravity of the rotating portion 3A can be located in the vicinity of a center of the rotary drive apparatus 1A. This leads to stable rotation of the rotary drive apparatus 1A.

2. Second Preferred Embodiment 2-1. Structure of Rotary Drive Apparatus

Figure 2:
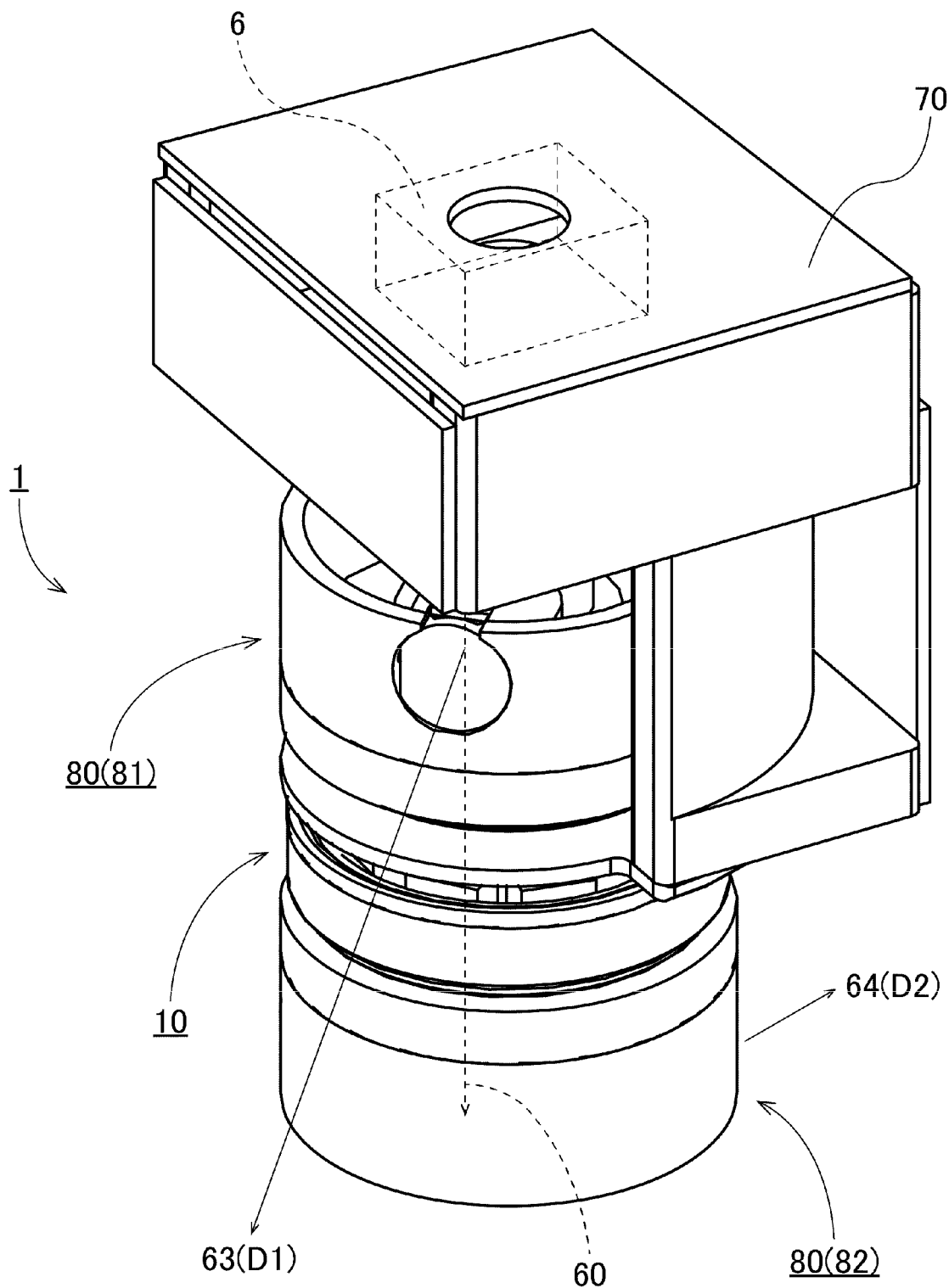
FIG. 2 is a perspective view of a rotary drive apparatus and a light source according to a second preferred embodiment of the present invention.
Figure 3:
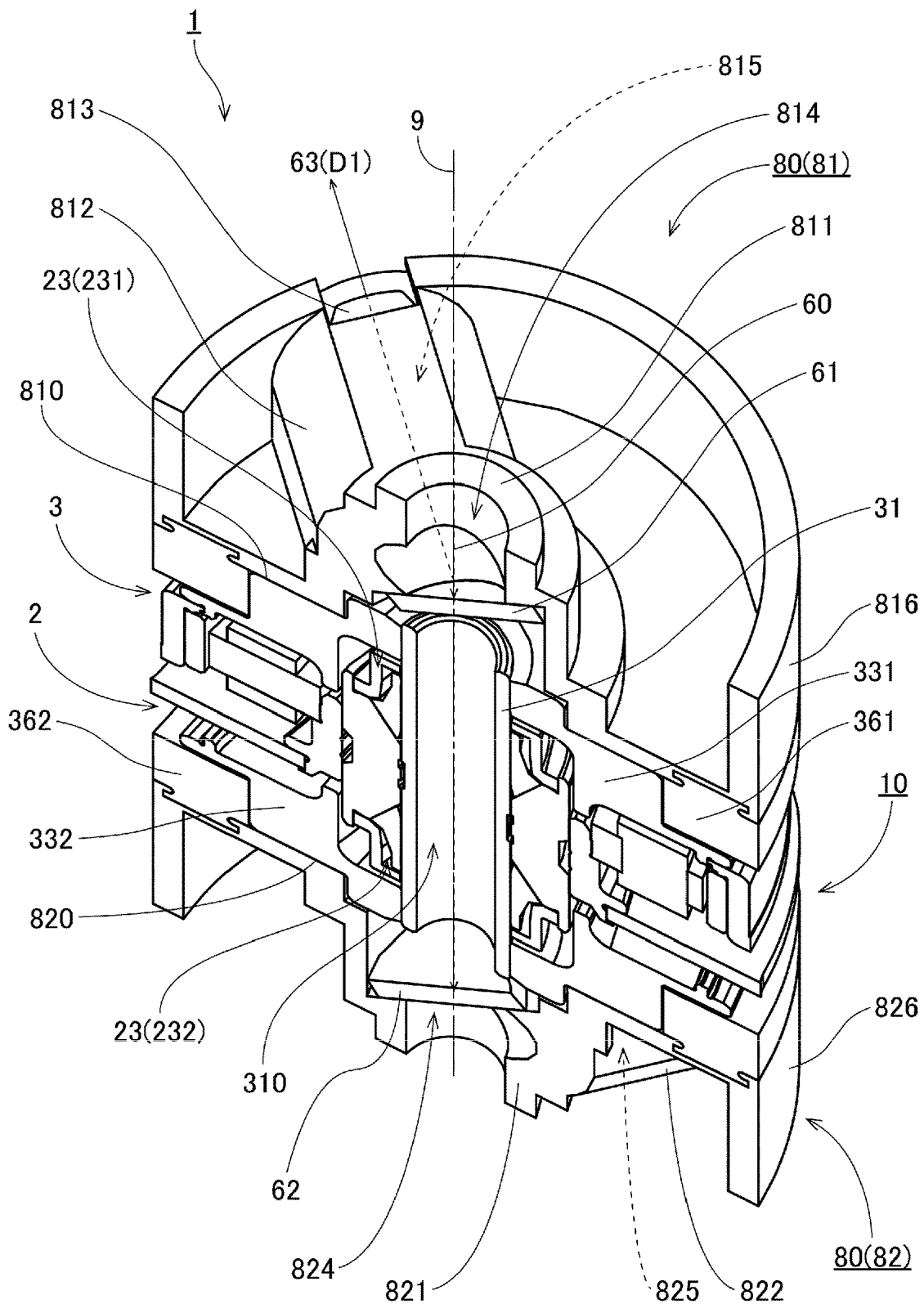
FIG. 3 is a perspective sectional view of the rotary drive apparatus according to the second preferred embodiment of the present invention.

FIG. 2 is a perspective view of a light source 6 and a rotary drive apparatus 1 according to a second preferred embodiment of the present invention. FIG. 3 is a perspective sectional view of the rotary drive apparatus 1 according to the second preferred embodiment taken along a plane including a central axis 9. The rotary drive apparatus 1 is an apparatus that receives incident light 60 from the light source 6, and emits reflected lights obtained by mirrors (which will be described below) reflecting the incident light 60 to an outside of the rotary drive apparatus 1 through lenses while rotating the mirrors. The light source 6 according to the present preferred embodiment is arranged outside of the rotary drive apparatus 1. Note, however, that the light source 6 may alternatively be included in the rotary drive apparatus 1.

Referring to FIGS. 2 and 3, the rotary drive apparatus 1 includes rotating bodies 80 and a motor 10 arranged to support the rotating bodies 80. The rotating bodies 80 include a first rotating body 81 and a second rotating body 82. The first rotating body 81 includes a first mirror 61 arranged to reflect a portion of the incident light 60 so that the portion of the incident light 60 will be emitted out of the rotary drive apparatus 1. The second rotating body 82 includes a second mirror 62 arranged to reflect another portion of the incident light 60 so that the other portion of the incident light 60 will be emitted out of the rotary drive apparatus 1.

2-2. Structure of Motor

Figure 4:
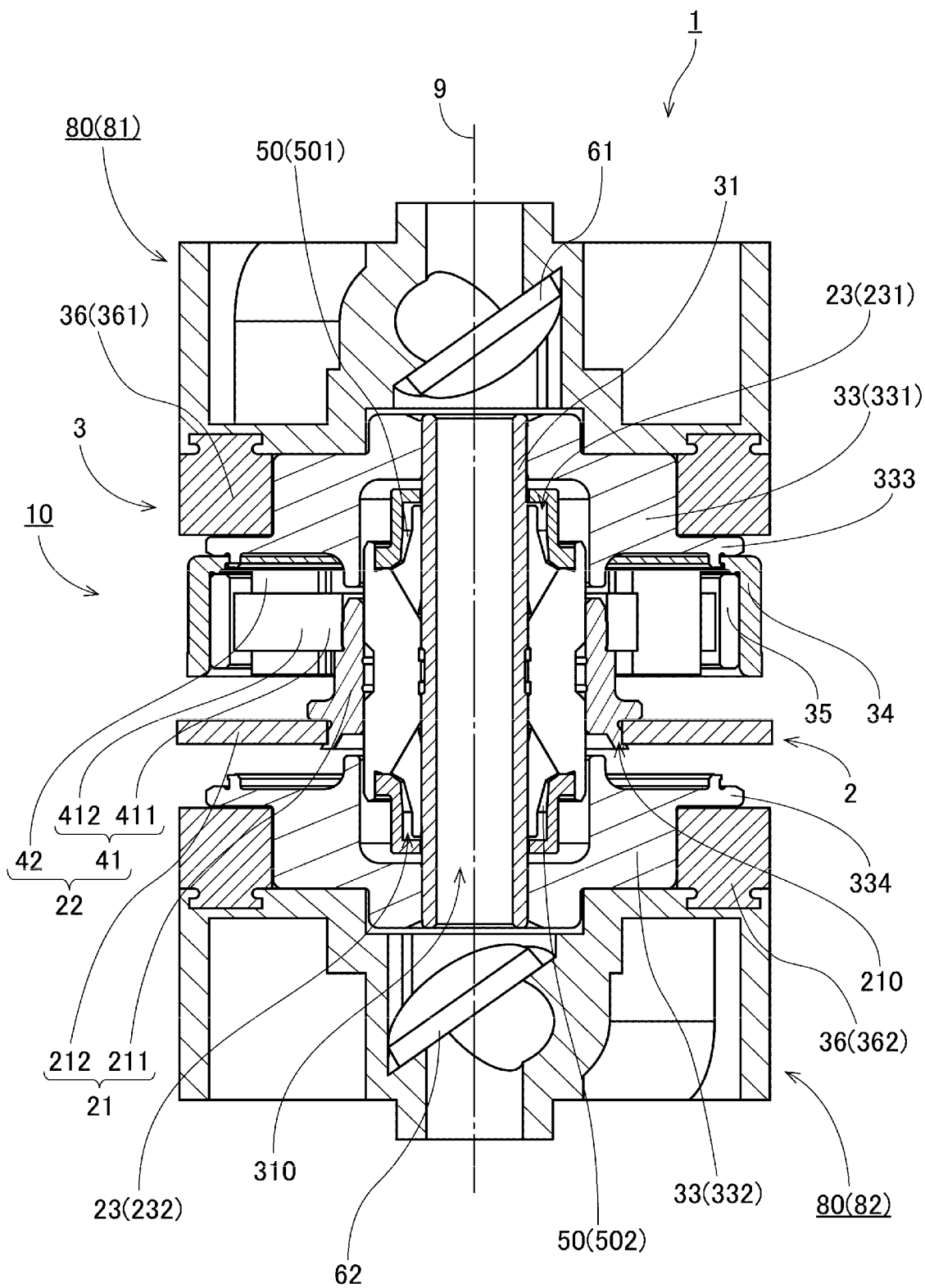
FIG. 4 is a vertical sectional view of the rotary drive apparatus according to the second preferred embodiment of the present invention.
Figure 5:
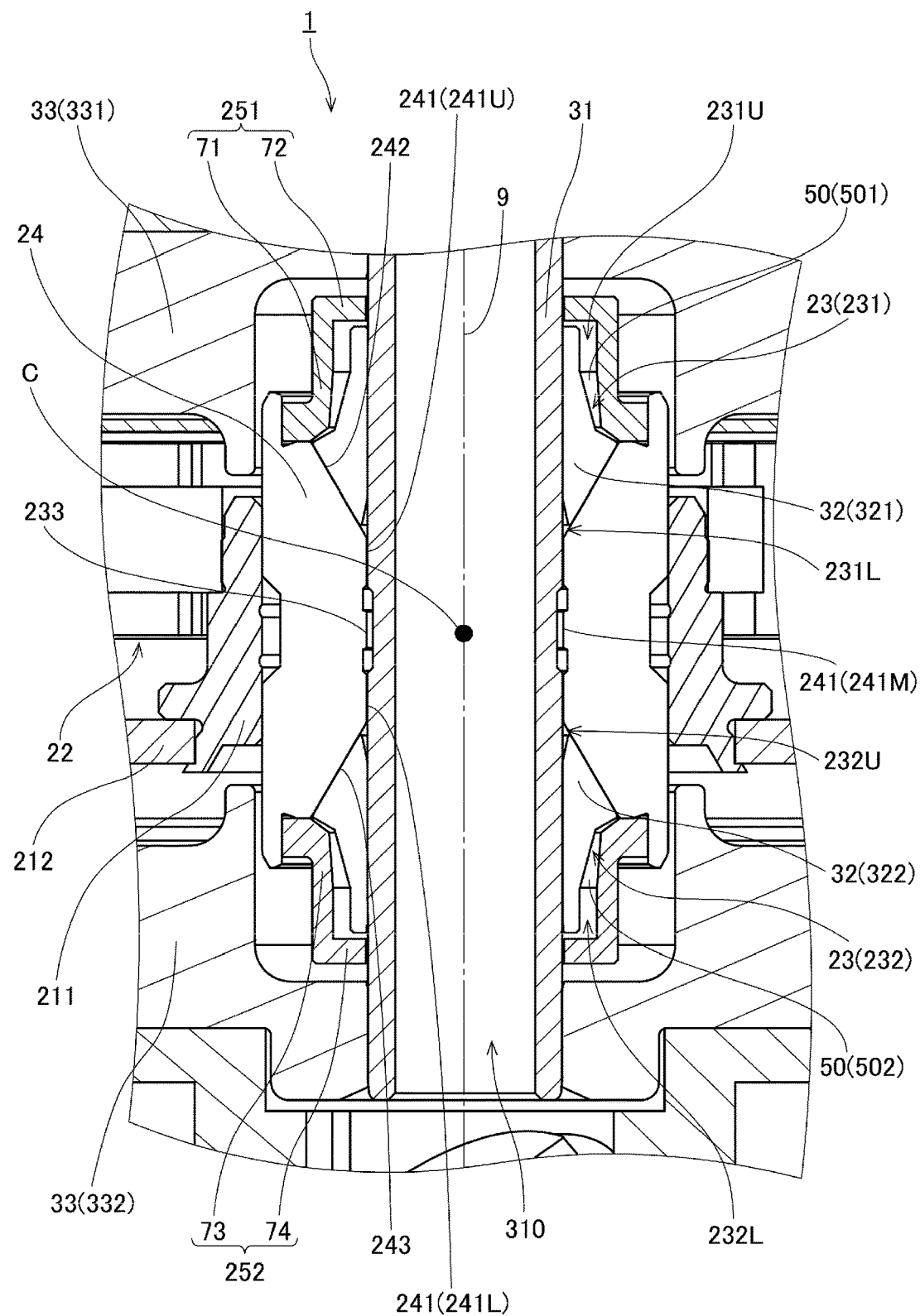
FIG. 5 is a partial vertical sectional view of the rotary drive apparatus according to the second preferred embodiment of the present invention.

Next, the structure of the aforementioned motor 10 will be described in more detail below. FIG. 4 is a vertical sectional view of the rotary drive apparatus 1 according to the second preferred embodiment. FIG. 5 is a partial vertical sectional view of the rotary drive apparatus 1 according to the second preferred embodiment. Referring to FIG. 4, the motor 10 includes a stationary portion 2 and a rotating portion 3. The stationary portion 2 is arranged to be stationary relative to a case or the like (not shown) in which the rotary drive apparatus is arranged. The rotating portion 3 is supported through a bearing portion 23, which will be described below, to be rotatable about the central axis 9, which extends in the vertical direction, with respect to the stationary portion 2.

The stationary portion 2 according to the present preferred embodiment includes a base portion 21, a stator 22, and the bearing portion 23, which is arranged to rotatably support a shaft 31 of the rotating portion 3, which will be described below.

The base portion 21 is arranged to extend perpendicularly to the central axis 9 between the first and second rotating bodies 81 and 82. The base portion 21 includes a stator holder 211 and a base body 212.

The base body 212 is a plate-shaped member arranged to support the stator holder 211. A metal, such as, for example, an aluminum alloy or stainless steel, is used as a material of the base body 212. The base body 212 is arranged to extend radially outward from an outer circumference of the stator holder 211. When the motor 10 is used, the base body 212 is, for example, fixed to the case or the like in which the rotary drive apparatus 1 is arranged through screws or the like. Note that a circuit board (not shown) may be arranged on an upper surface or a lower surface of the base body 212 to supply electric drive currents to the motor 10.

The stator holder 211 is a cylindrical member arranged to extend in the axial direction. A lower end portion of the stator holder 211 is inserted in a through hole 210 of the base body 212, and is fixed to the base body 212 by crimping. Note, however, that the stator holder 211 may alternatively be fixed to the base body 212 by another method, such as, for example, welding. Also note that the base body 212 and the stator holder 211 may alternatively be defined by a single continuous monolithic member.

The stator 22 is an armature including a stator core 41 and a plurality of coils 42. The stator 22 is arranged above at least a portion of the base portion 21. The stator core 41 is defined by, for example, laminated steel sheets, that is, electromagnetic steel sheets, such as silicon steel sheets, placed one upon another in the axial direction. The stator core is supported by being fixed to an outer circumferential surface of the stator holder 211 through, for example, an adhesive. In addition, the stator core 41 includes a core back 411 in the shape of a circular ring and a plurality of teeth 412 arranged to project radially outward from the core back 411. The coils 42 are a collection of conducting wires wound around the teeth 412. The electric drive currents for the motor 10 are supplied from an external power supply (not shown) to the coils 42 through the aforementioned circuit board and the conducting wires. The teeth 412 and the coils 42 are preferably arranged in the shape of a circular ring and at substantially regular intervals in a circumferential direction about the central axis 9.

As illustrated in FIG. 5, the bearing portion 23 includes a sleeve portion 24, a first cap 251, and a second cap 252.

The sleeve portion 24 is arranged to extend in the axial direction to substantially assume a cylindrical shape around the shaft 31, which will be described below. The sleeve portion 24 is inserted in a space radially inside of the stator holder 211, and is fixed to the stator holder 211 through, for example, an adhesive. An upper end portion of the sleeve portion 24 is arranged axially above an upper end portion of the stator holder 211 and an upper end portion of the stator 22. In addition, a lower end portion of the sleeve portion 24 is arranged axially below a lower end portion of the stator holder 211 and a lower end portion of the stator 22. Note that the sleeve portion 24 may be defined by a plurality of members.

The first cap 251 includes a first tubular portion 71 and a first plate portion 72. The first tubular portion 71 is fixed to the sleeve portion 24 in the vicinity of the upper end portion of the sleeve portion 24, and is arranged to extend upward to substantially assume a cylindrical shape. The first plate portion 72 is arranged to extend radially inward from an upper end portion of the first tubular portion 71.

The second cap 252 includes a second tubular portion 73 and a second plate portion 74. The second tubular portion 73 is fixed to the sleeve portion 24 in the vicinity of the lower end portion of the sleeve portion 24, and is arranged to extend downward to substantially assume a cylindrical shape. The second plate portion 74 is arranged to extend radially inward from a lower end portion of the second tubular portion 73.

The structure of the bearing portion 23 will be described in detail below.

The rotating portion 3 according to the present preferred embodiment includes the shaft 31, annular portions 32, rotor hub portions 33, a yoke 34, a magnet 35, and inertia portions 36.

The shaft 31 is a cylindrical member arranged to extend in the axial direction along the central axis 9 radially inside of the sleeve portion 24. A metal, such as, for example, stainless steel, is used as a material of the shaft 31. The material of the shaft 31 may be either ferromagnetic or nonmagnetic. An upper end portion of the shaft 31 is arranged to project upward above the upper end portion of the sleeve portion 24 and an upper end portion of the first cap 251. In addition, a lower end portion of the shaft 31 is arranged to project downward below the lower end portion of the sleeve portion 24 and a lower end portion of the second cap 252. An outer circumferential surface of the shaft 31 and an inner circumferential surface 241 of the sleeve portion 24 are arranged radially opposite to each other with a slight gap therebetween. In addition, the shaft 31 includes a shaft through hole 310 arranged to pass through the shaft 31 in the vertical direction. Note that the shaft 31 and at least one of the rotor hub portions 33, which will be described below, may alternatively be defined by a single monolithic member.

At least a portion of the shaft 31 including the upper end portion of the shaft 31 is arranged above the bearing portion 23. At least a portion of the shaft 31 including the lower end portion of the shaft 31 is arranged below the bearing portion 23. This enables the inertia portions 36, which will be described below, to be fixed to upper and lower portions of the shaft 31 through the rotor hub portions 33, which will be described below. Accordingly, the upper and lower inertia portions 36 can be caused to rotate along with rotation of the motor 10. This leads to more stable rotation of the motor 10.

The annular portions 32 include a first annular portion 321 and a second annular portion 322. The first annular portion 321 is a member at least a portion of which is fixed to the outer circumferential surface of the shaft 31 and is arranged to project radially outward all the way around the shaft 31 above the base body 212. Meanwhile, the second annular portion 322 is a member at least a portion of which is fixed to the outer circumferential surface of the shaft 31 and is arranged to project radially outward all the way around the shaft 31 below the base body 212. Note that the shaft 31 and at least one of the annular portions 32 may alternatively be defined by a single monolithic member.

An outer circumferential surface of a lower portion of the first annular portion 321 and an upper inclined surface 242 of the sleeve portion 24, which is included in an upper portion of the sleeve portion 24 and is inclined with respect to the axial direction, are arranged obliquely opposite to each other with a slight gap therebetween. Meanwhile, an outer circumferential surface of an upper portion of the second annular portion 322 and a lower inclined surface 243 of the sleeve portion 24, which is included in a lower portion of the sleeve portion 24 and is inclined with respect to the axial direction, are arranged obliquely opposite to each other with a slight gap therebetween.

Further, an outer circumferential surface of an upper portion of the first annular portion 321 and an inner circumferential surface of the first tubular portion 71 of the first cap 251 are arranged radially opposite to each other with a slight gap therebetween. In addition, an outer circumferential surface of a lower portion of the second annular portion 322 and an inner circumferential surface of the second tubular portion 73 of the second cap 252 are arranged radially opposite to each other with a slight gap therebetween.

The rotor hub portions 33 include a first rotor hub portion 331 and a second rotor hub portion 332. The first rotor hub portion 331 is arranged to extend radially outward from a peripheral portion of the upper end portion of the shaft 31 to assume an annular shape around the shaft 31. The second rotor hub portion 332 is arranged below the first rotor hub portion 331, and is arranged to extend radially outward from a peripheral portion of the lower end portion of the shaft 31 to assume an annular shape around the shaft 31.

An aluminum alloy or a ferromagnetic or nonmagnetic stainless steel, for example, is used as a material of the rotor hub portions 33. The upper end portion of the shaft 31 is fixed to the first rotor hub portion 331 at a position above the bearing portion 23. Specifically, the upper end portion of the shaft 31 is press fitted in a through hole defined radially inside of the first rotor hub portion 331 and passing through the first rotor hub portion 331 in the axial direction. In addition, the lower end portion of the shaft 31 is fixed to the second rotor hub portion 332 at a position below the bearing portion 23. Specifically, the lower end portion of the shaft 31 is press fitted in a through hole defined radially inside of the second rotor hub portion 332 and passing through the second rotor hub portion 332 in the axial direction. During the rotation of the motor 10, the shaft 31, the first rotor hub portion 331, the second rotor hub portion 332, and the inertia portions 36, which will be described below, rotate together. This contributes to stabilizing the rotation of the motor 10.

The yoke 34 is a cylindrical member fixed to a radial outside of the magnet 35, which will be described below, to hold the magnet 35. An outer circumferential surface of the magnet 35 is fixed to an inner circumferential surface of the yoke 34. The yoke 34 is arranged to be substantially coaxial with the central axis 9. An upper end portion of the yoke 34 is fixed to a lower portion of the first rotor hub portion 331 through an adhesive or by crimping, for example. A magnetic material having a relatively large mass, such as, for example, iron, is used as a material of the yoke 34. This leads to an increased inertial force of the rotating portion 3. This in turn leads to more stabilized posture of the rotating portion 3 while the motor 10 is running.

The magnet 35 is fixed to the inner circumferential surface of the yoke 34 through, for example, an adhesive. A permanent magnet in the shape of a circular ring is used as the magnet 35 according to the present preferred embodiment. The magnet 35 is substantially cylindrical, and is arranged radially outside of the stator 22. An inner circumferential surface of the magnet 35 includes north and south poles arranged to alternate with each other in the circumferential direction. In addition, the inner circumferential surface of the magnet 35 is arranged radially opposite to a radially outer end surface of each of the teeth 412 with a slight gap therebetween. Note that a plurality of magnets may be used in place of the magnet 35 in the shape of a circular ring. In the case where the plurality of magnets are used, the magnets are arranged on the inner circumferential surface of the yoke 34 such that pole surfaces of the north poles and pole surfaces of the south poles alternate with each other in the circumferential direction. The magnet 35 according to the present preferred embodiment is indirectly fixed to the first rotor hub portion 331 through the yoke 34 as described above. Note, however, that the magnet 35 may alternatively be directly fixed to the first rotor hub portion 331 without the yoke 34 intervening therebetween.

The inertia portions 36 include a first inertia portion 361 and a second inertia portion 362. The first inertia portion 361 is an annular member fixed to a lower side of the first rotating body 81, which will be described below. The second inertia portion 362 is an annular member fixed to an upper side of the second rotating body 82, which will be described below. The first inertia portion 361 is fixed to an outer circumferential surface of the first rotor hub portion 331 through, for example, an adhesive. The second inertia portion 362 is fixed to an outer circumferential surface of the second rotor hub portion 332 through, for example, an adhesive. Accordingly, the first and second inertia portions 361 and 362 rotate together with the rotating bodies 80 and the rotating portion 3 including the rotor hub portions 33 while the motor 10 is running. Note that the first inertia portion 361 may be directly fixed to the first rotor hub portion 331, or indirectly fixed thereto with another member therebetween. Also note that the second inertia portion 362 may be directly fixed to the second rotor hub portion 332, or indirectly fixed thereto with another member therebetween.

A metal, such as, for example, stainless steel, is used as a material of each of the first and second inertia portions 361 and 362. The first inertia portion 361 is arranged to have a specific gravity greater than a specific gravity of each of the first rotor hub portion 331 and the first rotating body 81. In addition, the second inertia portion 362 is arranged to have a specific gravity greater than a specific gravity of each of the second rotor hub portion 332 and the second rotating body 82. Accordingly, provision of the first and second inertia portions 361 and 362 increases the inertial force of the rotating portion 3 while the motor 10 is running. This contributes to stabilizing the posture of the rotating portion 3. Note that each of the first and second inertia portions 361 and 362 may alternatively be made of a resin.

In this motor 10, a lower surface of the first inertia portion 361 is arranged to be in contact with an upper surface of a first flange portion 333 arranged to extend radially in the lower portion of the first rotor hub portion 331. This stabilizes the axial position of the first inertia portion 361. Further, in this motor 10, the first inertia portion 361 is arranged above the first flange portion 333 and below the first rotating body 81. That is, the first inertia portion 361 is held between the first rotor hub portion 331 and the first rotating body 81. This further stabilizes the axial position of the first inertia portion 361. In addition, an upper surface of the second inertia portion 362 is arranged to be in contact with a lower surface of a second flange portion 334 arranged to extend radially in an upper portion of the second rotor hub portion 332. This stabilizes the axial position of the second inertia portion 362.

Moreover, in this motor 10, the second inertia portion 362 is arranged below the second flange portion 334 and above the second rotating body 82. That is, the second inertia portion 362 is held between the second rotor hub portion 332 and the second rotating body 82. This further stabilizes the axial position of the second inertia portion 362. The stabilized axial position of both the upper and lower inertia portions 36 contributes to preventing a tilt of the inertia portions 36. Accordingly, the posture of the rotating portion 3 is further stabilized while the motor 10 is running. In addition, the first inertia portion 361 is arranged above the base portion 21, while the second inertia portion 362 is arranged below the base portion 21. Thus, mass is distributed in a well-balanced manner between upper and lower portions of the rotating portion 3. This contributes to further stabilizing the posture of the rotating portion 3 while the motor 10 is running.

Once, in the motor 10 described above, the electric drive currents are supplied to the coils 42 through the aforementioned circuit board, magnetic flux is generated around each of the teeth 412. Then, interaction between the magnetic flux of the teeth 412 and magnetic flux of the magnet 35 produces a circumferential torque between the stationary portion 2 and the rotating portion 3, so that the rotating portion 3 is caused to rotate about the central axis 9 with respect to the stationary portion 2. The inertia portions 36, which are fixed to the rotor hub portions 33, and the rotating bodies 80, which are supported by the rotating portion 3 and will be described below, rotate about the central axis 9 together with the rotating portion 3.

2-3. Structure of Bearing Portion

Next, the structure of the bearing portion 23 will be described in detail below.

As described above, the stationary portion 2, which includes the sleeve portion 24, the first cap 251, and the second cap 252, and the rotating portion 3, which includes the shaft 31, the first annular portion 321, and the second annular portion 322, are arranged opposite to each other with a gap therebetween. In addition, a lubricating oil 50 is arranged in this gap. A fluid dynamic pressure is induced in the lubricating oil 50 by a dynamic pressure groove defined in the inner circumferential surface of the sleeve portion 24 while the motor 10 is running. The rotating portion 3 is thus supported by the stationary portion 2, so that the rotating portion 3 can stably rotate. That is, in the present preferred embodiment, a bearing mechanism is defined by a combination of the sleeve portion 24, the first cap 251, and the second cap 252, which are components of the stationary portion 2, a combination of the shaft 31, the first annular portion 321, and the second annular portion 322, which are components of the rotating portion 3, and the lubricating oil 50 arranged in the gap.

A polyolester oil or a diester oil, for example, is used as the lubricating oil 50. While the motor 10 is running, the rotating portion 3, which includes the shaft 31, the first annular portion 321, and the second annular portion 322, rotates about the central axis 9 while being supported through the lubricating oil 50 to be rotatable with respect to the stationary portion 2, which includes the sleeve portion 24, the first cap 251, and the second cap 252.

The lubricating oil 50 is arranged to exist continuously in the gap between the outer circumferential surface of the upper portion of the first annular portion 321 and the inner circumferential surface of the first tubular portion 71 of the first cap 251, the gap between the outer circumferential surface of the lower portion of the first annular portion 321 and the upper inclined surface 242, which is included in the upper portion of the sleeve portion 24 and is inclined with respect to the axial direction, and a gap between the outer circumferential surface of the shaft 31 and an upper portion 241U of the inner circumferential surface 241 of the sleeve portion 24. In addition, the lubricating oil 50 is arranged to exist continuously in a gap between the outer circumferential surface of the shaft 31 and a lower portion 241L of the inner circumferential surface 241 of the sleeve portion 24, the gap between the outer circumferential surface of the upper portion of the second annular portion 322 and the lower inclined surface 243, which is included in the lower portion of the sleeve portion 24 and is inclined with respect to the axial direction, and the gap between the outer circumferential surface of the lower portion of the second annular portion 322 and the inner circumferential surface of the second tubular portion 73 of the second cap 252. However, the lubricating oil 50 does not exist in an axial middle portion of the gap between the outer circumferential surface of the shaft 31 and the inner circumferential surface 241 of the sleeve portion 24.

As described above, the bearing portion 23 has a so-called partially-filled structure, in which the lubricating oil 50 exists at two or more separate locations in the gap where the stationary portion 2 and the rotating portion 3 are opposed to each other. The lubricating oil 50 includes an upper lubricating oil 501 arranged to exist above the base body 212 of the motor 10, and a lower lubricating oil 502 arranged to exist below the base body 212. Note that, in the present preferred embodiment, a gap between the outer circumferential surface of the shaft 31 and a middle portion 241M of the inner circumferential surface 241 of the sleeve portion 24 is a space where no lubricating oil 50 is arranged.

That is, this bearing mechanism includes an upper bearing portion 231 and a lower bearing portion 232 provided separately. The upper bearing portion 231 is defined by components of the stationary portion 2 including the first cap 251 and a portion of the sleeve portion 24 above the base body 212, components of the rotating portion 3 including the first annular portion 321 and a portion of the shaft 31 above the base body 212, and the upper lubricating oil 501. Meanwhile, the lower bearing portion 232 is defined by components of the stationary portion 2 including the second cap 252 and a portion of the sleeve portion 24 below the base body 212, components of the rotating portion 3 including the second annular portion 322 and a portion of the shaft 31 below the base body 212, and the lower lubricating oil 502.

The stationary portion 2 is arranged to radially overlap with at least a portion of the upper bearing portion 231. The stationary portion 2 is arranged to radially overlap with a center C of gravity of the rotating bodies 3, which will be described below. This leads to more stable rotation of the rotary drive apparatus 1. Note that the stationary portion 2 may not necessarily be arranged to radially overlap with at least a portion of the upper bearing portion 231. Specifically, the stationary portion 2 may be arranged to radially overlap with at least a portion of the lower bearing portion 232. In this case, the center C of gravity of the rotating bodies 3 may be located at a lower position to achieve more stable rotation of the rotary drive apparatus 1.

As described above, the base body 212 is arranged between the upper bearing portion 231, which is arranged to induce a fluid dynamic pressure in the upper lubricating oil 501, which exists in a gap which is at least in part located above the base body 212, and the lower bearing portion 232, which is arranged to induce a fluid dynamic pressure in the lower lubricating oil 502, which exists in a gap which is at least in part located below the base body 212. As a result, the upper and lower portions of the rotating portion 3 are supported by the bearing portion 23 in a well-balanced manner. Accordingly, posture of the rotary drive apparatus 1 is further stabilized while the motor 10 is running.

In the present preferred embodiment, the center C of gravity of the rotating portion 3 is located below an upper end 231U of the upper bearing portion 231 and above a lower end 232L of the lower bearing portion 232. As described above, the first and second inertia portions 361 and 362, each of which has a large specific gravity, are arranged in the upper and lower portions, respectively, of the rotating portion 3, so that the center C of gravity of the rotating portion 3 can be located in the vicinity of a center of the motor 10. This leads to stable rotation of the motor 10. Further, the center C of gravity of the rotating portion 3 is preferably located below a lower end 231L of the upper bearing portion 231. Moreover, the center C of gravity of the rotating portion 3 is preferably located above an upper end 232U of the lower bearing portion 232. This leads to more stable rotation of the motor 10.

Note that the bearing mechanism may alternatively be arranged to have a so-called full-fill structure, in which the lubricating oil 50 is arranged to exist continuously in the gap between the outer circumferential surface of the upper portion of the first annular portion 321 and the inner circumferential surface of the first tubular portion 71 of the first cap 251, the gap between the outer circumferential surface of the lower portion of the first annular portion 321 and the upper inclined surface 242, which is included in the upper portion of the sleeve portion 24 and is inclined with respect to the axial direction, the gap between the outer circumferential surface of the shaft 31 and the inner circumferential surface 241 of the sleeve portion 24, the gap between the outer circumferential surface of the upper portion of the second annular portion 322 and the lower inclined surface 243, which is included in the lower portion of the sleeve portion 24 and is inclined with respect to the axial direction, and the gap between the outer circumferential surface of the lower portion of the second annular portion 322 and the inner circumferential surface of the second tubular portion 73 of the second cap 252, that is, in a gap where the stationary portion 2 and the rotating portion 3 are opposed to each other and which is arranged both above and below the base body 212. This reduces the likelihood that a shock applied to the motor 10 during rotation thereof would cause a contact between the rotating portion 3 and the stationary portion 2.

An upper surface of the lubricating oil 50 is defined in the gap between the outer circumferential surface of the upper portion of the first annular portion 321 and the inner circumferential surface of the first tubular portion 71 of the first cap 251, and is arranged to radially overlap with the first rotor hub portion 331. In addition, a lower surface of the lubricating oil 50 is defined in the gap between the outer circumferential surface of the lower portion of the second annular portion 322 and the inner circumferential surface of the second tubular portion 73 of the second cap 252, and is arranged to radially overlap with the second rotor hub portion 332.

Further, in the case where the bearing mechanism has the full-fill structure, within the upper and lower bearing portions 231 and 232, a radial bearing portion 233, where the outer circumferential surface of the shaft 31 and at least a portion of the stationary portion 2, including the inner circumferential surface 241 of the sleeve portion 24, are arranged radially opposite to each other with a gap (i.e., a radial gap) in which the lubricating oil 50 exists therebetween, is arranged to radially overlap with the center C of gravity of the rotating portion 3. This leads to more stable rotation of the rotary drive apparatus 1.

2-4. Structure of Rotating Bodies

Next, the structure of the rotating bodies 80 will be described in detail below.

Reference is made again to FIGS. 2 and 3. A frame 70 containing the light source 6 is arranged above the rotary drive apparatus 1. The frame 70 is fixed to the case or the like in which the rotary drive apparatus 1 is arranged. The incident light 60, which travels downward along the central axis 9 of the motor 10, is emitted by the light source 6.

The rotating bodies 80 include the first and second rotating bodies 81 and 82. The first rotating body 81 is supported by an upper end portion of the rotating portion 3 of the motor 10, and is arranged to rotate about the central axis 9 together with the rotating portion 3. The second rotating body 82 is supported by a lower end portion of the rotating portion 3 of the motor 10, and is arranged to rotate about the central axis 9 together with the rotating portion 3. A resin, for example, is used as a material of each of the first and second rotating bodies 81 and 82, excluding the first and second mirrors 61 and 62, which will be described below.

As illustrated in FIG. 3, a lower surface 810 of the first rotating body 81 is fixed to upper surfaces of the first rotor hub portion 331 and the first inertia portion 361 through, for example, engagement, an adhesive, or the like. The first rotating body 81 includes a first vertical cylindrical portion 811, the first mirror 61, a first horizontal cylindrical portion 812, and a first lens 813.

The first vertical cylindrical portion 811 is a cylindrical portion arranged to be substantially coaxial with the central axis 9 of the motor 10, and extend in the axial direction. A lower end portion of the first vertical cylindrical portion 811 and an upper end portion of the shaft through hole 310 are arranged axially opposite to each other. That is, a cavity 814 radially inside of the first vertical cylindrical portion 811 is axially continuous with the shaft through hole 310. The cavity 814 radially inside of the first vertical cylindrical portion 811 and the shaft through hole 310 define an optical waveguide.

At least a portion of the first mirror 61 is arranged on the central axis 9 above the bearing portion 23. In the present preferred embodiment, the first mirror 61 is fixed to a resin member of the first rotating body 81 between the lower end portion of the first vertical cylindrical portion 811 and the upper end portion of the shaft 31. In addition, the first mirror is inclined at an angle of 45° with respect to the axial direction and a first radial direction, which will be described below. The first mirror 61 is a half mirror the transmissivity and reflectivity of which are substantially equal. Note that the first mirror 61 may be supported by being indirectly fixed to the rotating portion 3 through the resin member of the first rotating body 81 above the first inertia portion 361 as described above, or may alternatively be supported by being directly fixed to the rotating portion 3.

The first horizontal cylindrical portion 812 is a cylindrical member arranged to extend radially outward (i.e., in the first radial direction D1) from a vicinity of the lower end portion of the first vertical cylindrical portion 811. A cavity 815 inside of the first horizontal cylindrical portion 812 is joined to the cavity 814 radially inside of the first vertical cylindrical portion 811 at right angles. The cavity 815 inside of the first horizontal cylindrical portion 812 and the first mirror 61 are arranged to overlap with each other when viewed in the first radial direction D1.

The first lens 813 is arranged to cover a radially outer end portion of the first horizontal cylindrical portion 812.

The incident light 60 emitted from the light source 6 enters from above the first vertical cylindrical portion 811, and travels downward along the central axis 9 in the cavity 814 radially inside of the first vertical cylindrical portion 811. Then, a portion of the incident light 60 is reflected by the first mirror 61, and another portion of the incident light 60 passes through the first mirror 61 and travels further downward. A first reflected light 63, which is the portion of the incident light 60 reflected by the first mirror 61, travels in the first radial direction D1 in the cavity 815 inside of the first horizontal cylindrical portion 812, and exits the rotary drive apparatus 1 through the first lens 813.

An upper surface 820 of the second rotating body 82 is fixed to lower surfaces of the second inertia portion 362 and the second rotor hub portion 332 through, for example, engagement, an adhesive, or the like. The second rotating body includes a second vertical cylindrical portion 821, the second mirror 62, a second horizontal cylindrical portion 822, and a second lens (not shown).

The second vertical cylindrical portion 821 is a cylindrical portion arranged to be substantially coaxial with the central axis 9 of the motor 10, and extend in the axial direction. An upper end portion of the second vertical cylindrical portion 821 and a lower end portion of the shaft through hole 310 are arranged axially opposite to each other. That is, a cavity 824 radially inside of the second vertical cylindrical portion 821 is axially continuous with the shaft through hole 310. The cavity 824 radially inside of the second vertical cylindrical portion 821 defines an optical waveguide.

At least a portion of the second mirror 62 is arranged on the central axis 9 below the bearing portion 23. In the present preferred embodiment, the second mirror 62 is fixed to a resin member of the second rotating body 82 between the upper end portion of the second vertical cylindrical portion 821 and the lower end portion of the shaft 31. In addition, the second mirror 62 is inclined at an angle of 45° with respect to the axial direction and a second radial direction, which will be described below. A fully reflective mirror is used as the second mirror 62. Note that the second mirror 62 may be supported by being indirectly fixed to the rotating portion 3 through the resin member of the second rotating body 82 below the second inertia portion 362 as described above, or may alternatively be supported by being directly fixed to the rotating portion 3.

The second horizontal cylindrical portion 822 is a cylindrical member arranged to extend radially outward (i.e., in the second radial direction D2) from a vicinity of the upper end portion of the second vertical cylindrical portion 821. A cavity 825 inside of the second horizontal cylindrical portion 822 is joined to the cavity 824 radially inside of the second vertical cylindrical portion 821 at right angles. The cavity 825 inside of the second horizontal cylindrical portion 822 and the second mirror 62 are arranged to overlap with each other when viewed in the second radial direction D2.

The second lens (not shown) is arranged to cover a radially outer end portion of the second horizontal cylindrical portion 822.

As described above, the other portion of the incident light 60 which passes through the first mirror 61 further travels downward. Then, this portion passes through the shaft through hole 310, and is reflected by the second mirror 62. A second reflected light 64, which is the portion of the incident light 60 reflected by the second mirror 62, travels in the second radial direction D2 in the cavity 825 inside of the second horizontal cylindrical portion 822, and exits the rotary drive apparatus 1 through the second lens (not shown).

Each of the first mirror 61 of the first rotating body 81 and the second mirror 62 of the second rotating body 82 is arranged to reflect the incident light 60 from the light source and emit the reflected light to the outside while rotating about the central axis 9 together with the rotating portion 3 of the motor 10. A portion of the incident light 60 passes through the shaft through hole 310, and this enables the incident light, which travels in one direction from the single light source 6 before the entry, to be reflected in the upper and lower rotating bodies 80 and the resulting reflected lights to be emitted to the outside while rotating. As a result, a wide range can be efficiently irradiated with light. Moreover, a wide range can be irradiated with light using the one light source 6 and the one motor 10, and the rotary drive apparatus 1 can be used even when a space in which the rotary drive apparatus 1 is to be installed is limited.

The first radial direction D1, in which the first reflected light 63 reflected by the first mirror 61 of the first rotating body 81 is emitted to the outside, and the second radial direction D2, in which the second reflected light 64 reflected by the second mirror 62 of the second rotating body 82 is emitted to the outside, are different from each other. As a result, the first and second reflected lights 63 and 64, which are emitted in the two different directions, take different times to reach an object to be irradiated with light while the motor 10 is rotating, and this makes it possible to recognize the three-dimensional position of the object in a space.

An outer circumferential surface 816 of the first rotating body 81 is arranged to have a reflectivity lower than that of a surface of the first mirror 61, and an outer circumferential surface 826 of the second rotating body 82 is arranged to have a reflectivity lower than that of a surface of the second mirror 62. This contributes to preventing diffuse reflection of the incident light 60 from the light source 6.

In the present preferred embodiment, the first and second rotating bodies 81 and 82 are arranged to have the same shape and size. As a result, each of the first and second rotating bodies 81 and 82, each of which is made of the resin, can be molded using one mold, excluding the first and second mirrors 61 and 62, which leads to a cost reduction. Note that the first and second rotating bodies 81 and 82 may alternatively be arranged to have different sizes and/or shapes. For example, the second vertical cylindrical portion 821 of the second rotating body 82 may not include the cavity 824 radially inside thereof.

3. Modifications

While preferred embodiments of the present invention have been described above, it will be understood that the present invention is not limited to the above-described preferred embodiments.

Figure 6:
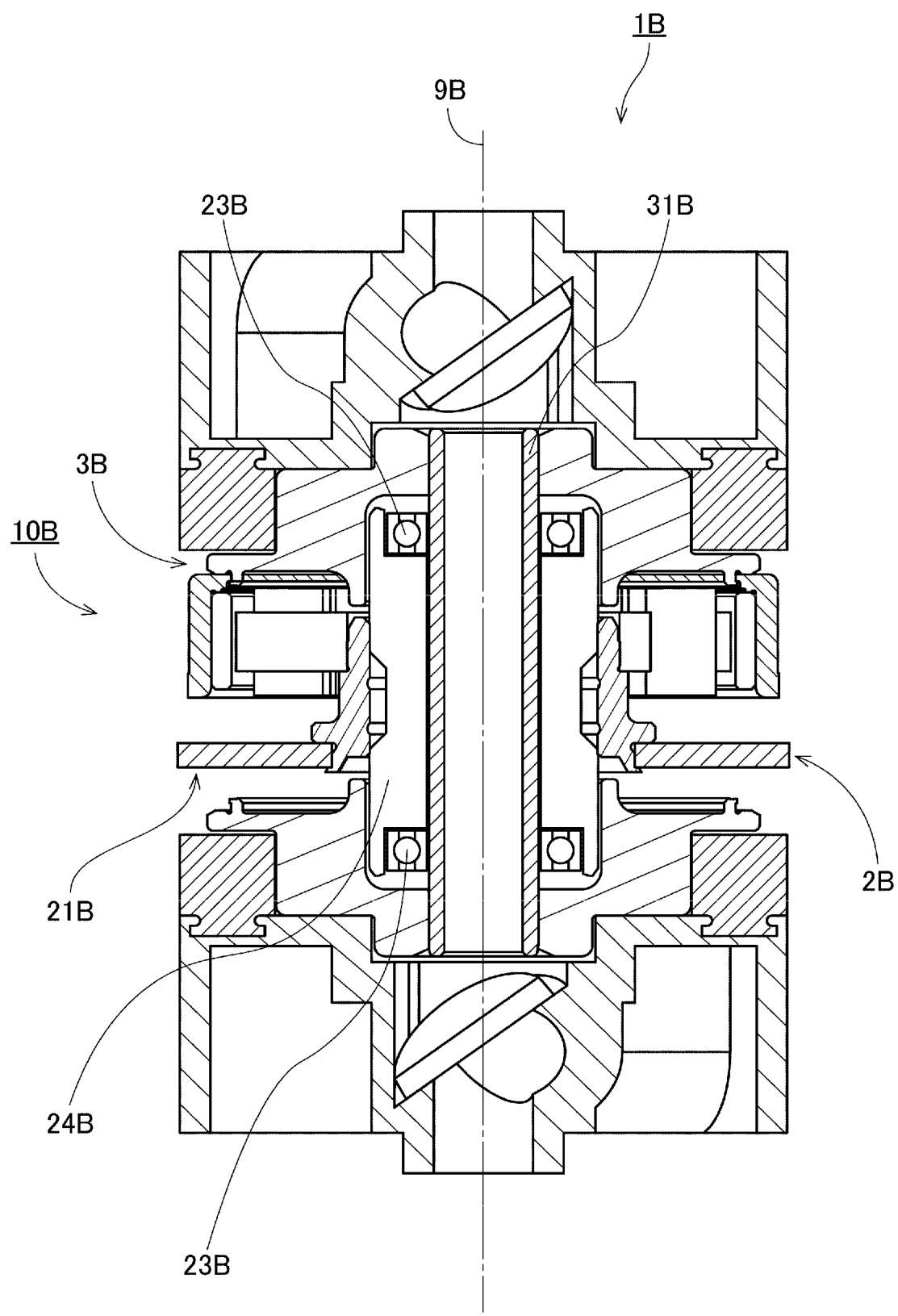
FIG. 6 is a vertical sectional view of a rotary drive apparatus according to a modification of the second preferred embodiment of the present invention.

FIG. 6 is a vertical sectional view of a rotary drive apparatus 1B according to a modification of the second preferred embodiment. In the modification illustrated in FIG. 6, rolling-element bearings are arranged between an inner circumferential surface of a sleeve portion 24B and an outer circumferential surface of a shaft 31B axially above and below a base portion 21B. A rotating portion 3B of a motor 10B is supported through a bearing portion 23B, which is defined by the rolling-element bearings, to be rotatable about a central axis 9B with respect to a stationary portion 2B.

Note that a bearing having another structure, such as, for example, a plain bearing, may alternatively be arranged between the stationary portion and the rotating portion.

The motor 10 used in the rotary drive apparatus 1 according to the second preferred embodiment is a so-called outer-rotor motor, in which the magnet 35 is arranged radially outward of the stator 22. Note, however, that a so-called inner-rotor motor, in which a magnet is arranged radially inward of a stator, may alternatively be used in a rotary drive apparatus according to another preferred embodiment of the present invention.

Also note that, instead of the upper and lower rotating bodies, impellers or disks may be installed above and below the motor in rotary drive apparatuses according to other preferred embodiments of the present invention, and that the rotary drive apparatuses according to other preferred embodiments of the present invention may be used as fan motors to supply air flows or as spindle motors to rotate the disks.

Note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, rotary drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotary drive apparatus comprising:
    a stationary portion including a stator; and
    a rotating portion supported through a bearing portion to be rotatable about a central axis extending in a vertical direction with respect to the stationary portion, the rotating portion including a magnet arranged opposite to the stator; wherein
    the rotating portion includes:
        a shaft extending along the central axis;
        a first rotor hub portion located at a first end of the shaft above a sleeve portion in the vertical direction, and extending in an annular shape around the shaft;
        a first outer circumferential surface provided on the first rotor hub portion, the first outer circumferential surface being located a predetermined distance from the central axis;
        a first inertia portion located radially outward relative to and directly or than that of the first rotor hub portion;
        a second rotor hub portion located at a second end of the shaft below the sleeve portion in the vertical direction, and extending in an annular shape around the shaft;
        a second outer circumferential surface provided on the second rotor hub portion, the second outer circumferential surface being located a predetermined distance from the central axis; and
        a second inertia portion located radially outward relative to and directly or indirectly fixed to the second outer circumferential surface, and having a specific gravity greater than that of the second rotor hub portion;
    the stationary portion includes:
        the sleeve portion rotatably supporting the shaft; and
        a base portion directly or indirectly supporting the sleeve portion;
    the first inertia portion is above the base portion;
    the second inertia portion is below the base portion;
    the bearing portion includes:
        an upper bearing portion; and
        a lower bearing portion below the upper bearing portion; and
    a center of gravity of the rotating portion is located below an upper end of the upper bearing portion and above a lower end of the lower bearing portion.

2. The rotary drive apparatus according to claim 1, wherein the center of gravity is located above an upper end of the lower bearing portion.

3. The rotary drive apparatus according to claim 1, wherein the center of gravity is located below a lower end of the upper bearing portion.

4. The rotary drive apparatus according to claim 1, wherein
    at least a portion of the upper bearing portion is above the base portion; and
    at least a portion of the lower bearing portion is below the base portion.

5. The rotary drive apparatus according to claim 1, wherein the stationary portion radially overlaps at least a portion of the upper bearing portion.

6. The rotary drive apparatus according to claim 1, wherein the stationary portion radially overlaps at least a portion of the lower bearing portion.

7. The rotary drive apparatus according to claim 1, further comprising:
    a first mirror directly or indirectly supported by the rotating portion above the first inertia portion; and
    a second mirror directly or indirectly supported by the rotating portion below the second inertia portion; wherein
    the first mirror is arranged to reflect a portion of incident light coming from a light source to cause the portion of the incident light to be emitted out of the rotary drive apparatus; and
    the second mirror is arranged to reflect another portion of the incident light to cause the other portion of the incident light to be emitted out of the rotary drive apparatus.

8. The rotary drive apparatus according to claim 1, wherein
    at least a portion of the shaft including an upper end of the shaft is above the bearing portion; and
    at least a portion of the shaft including a lower end of the shaft is below the bearing portion.

9. The rotary drive apparatus according to claim 8, wherein the shaft is fixed to the first rotor hub portion at a position above the bearing portion, and is fixed to the second rotor hub portion at a position below the bearing portion.

10. The rotary drive apparatus according to claim 1, wherein the magnet is radially outward of the stator.

11. The rotary drive apparatus according to claim 1, wherein in the bearing portion, the stationary portion and the rotating portion are arranged opposite to each other with a gap therebetween, the gap including a lubricating oil therein, and the bearing portion induces a fluid dynamic pressure in the lubricating oil.

12. The rotary drive apparatus according to claim 11, wherein the lubricating oil is provided continuously in the gap.

13. The rotary drive apparatus according to claim 11, wherein the lubricating oil is provided at two or more separate locations in the gap.

14. The rotary drive apparatus according to claim 1, wherein the bearing portion is defined by rolling-element bearings.

15. The rotary drive apparatus according to claim 1, wherein each of the first and second inertia portions is made of a resin.

16. The rotary drive apparatus according to claim 1, wherein each of the first and second inertia portions is made of a metal.

17. The rotary drive apparatus according to claim 7, wherein
    the shaft includes a through hole which defines an optical waveguide which permits the incident light coming from the light source to pass between the first mirror and the second mirror.

18. A rotor drive apparatus comprising:
    a shaft extending along a central axis in a vertical direction;
    a sleeve portion rotatably supporting the shaft through a first bearing portion and a second bearing portion located below the first bearing portion in the vertical direction;
    a base portion directly or indirectly supporting the sleeve portion;

a stator fixed to the base portion, the stator including teeth;

a first rotor hub portion adapted to a first end of the shaft, located above the sleeve portion in the vertical direction, and extending in an annular shape around the shaft;

a first outer circumferential surface provided on the first rotor hub portion, with the first outer circumferential surface being located at a predetermined distance from the central axis;

a first inertia portion radially outward from and directly or indirectly fixed to the first outer circumferential surface, and having a specific gravity greater than that of the first rotor hub portion;

a magnet attached to an inner surface of the base portion, the magnet opposing the teeth of the stator with a gap therebetween;

a second rotor hub portion adapted to a second end of the shaft, located below the sleeve portion in the vertical direction, and extending in an annular shape around the shaft;

a second outer circumferential surface provided on the second rotor hub portion, with the second outer circumferential surface being located a predetermined distance from the central axis;

a second inertia portion radially outward from and directly or indirectly fixed to the second outer circumferential surface, and having a specific gravity greater than that of the second rotor hub portion; wherein the first inertia portion and the second inertia portion are adapted to the first rotor hub portion and the second rotor hub portion such that a center of gravity of a rotating portion that is rotatable with the shaft is located between the first bearing portion and the second bearing portion.

* * * * *